Feb. 18, 1958  A. L. McCLAIN  2,823,865
SELF TOWING DEVICE
Filed Sept. 17, 1954
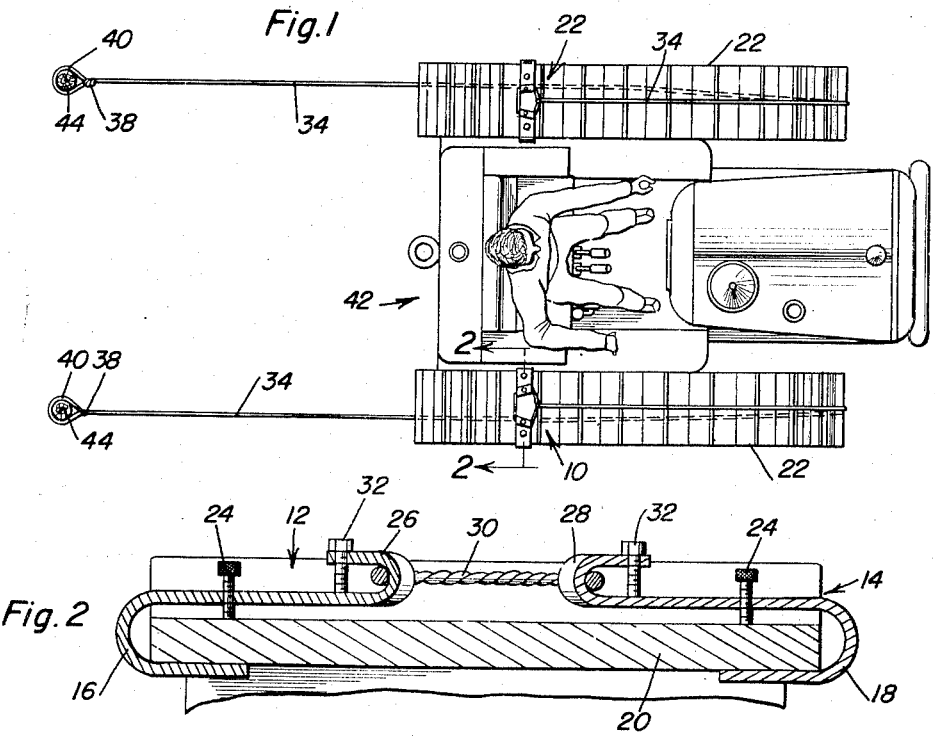
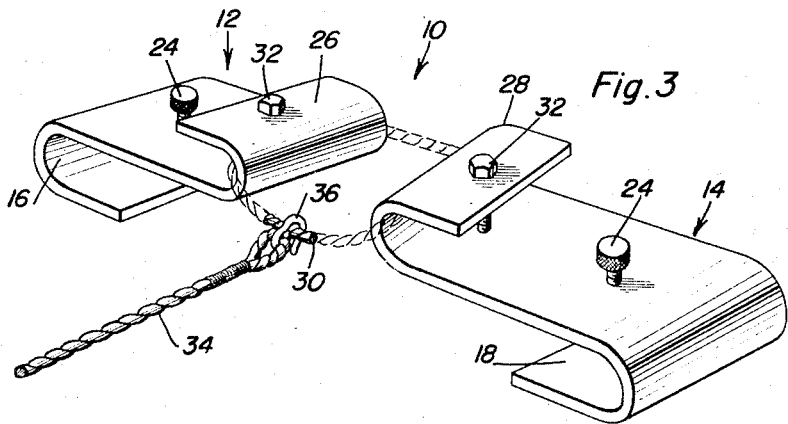
Archie L. McClain
INVENTOR.

United States Patent Office 2,823,865
Patented Feb. 18, 1958

2,823,865

SELF TOWING DEVICE

Archie L. McClain, Leesville, La.

Application September 17, 1954, Serial No. 456,711

2 Claims. (Cl. 238—14)

This invention relates in general to new and useful improvements in vehicle towing devices, and more specifically to an improved self towing device specifically intended for use in conjunction with track vehicles.

Although track vehicles are designed for movement over soft ground, at times a track vehicle will become stuck and due to its size and weight it is extremely difficult to tow such a vehicle from the soft ground.

It is therefore the primary object of this invention to provide a towing device which is of such a nature whereby the track vehicle which is stuck may utilize the towing device to extract itself.

Another object of this invention is to provide an improved self towing device which is of such a nature whereby it may be conveniently secured to a track of a track vehicle for facilitating the towing of the vehicle from a stuck condition in response to turning of the track.

A further object of this invention is to provide an improved self towing device for track vehicles, the self towing device being extremely small and being of such a nature whereby it may be conveniently attached to a track for use.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a top plan view of a track vehicle and shows the same having attached to the tracks thereof self towing devices for pulling the track vehicle rearwardly from a stuck condition;

Figure 2 is an enlarged fragmentary, vertical sectional view taken substantially upon the plane indicated by the section line 2—2 of Figure 1 and shows the details of the main parts of the self towing device in relationship thereof with respect to a seat of a track of the track vehicle; and Figure 3 is an enlarged rotated perspective view of the self towing device and shows the general details thereof.

Referring now to the drawings in detail, it will be seen that there is best illustrated in Figure 3, the self towing device which is the subject of this invention, the self towing device being referred to in general by the reference numeral 10. The self-towing device 10 includes a pair of generally S-shaped members which are referred to in general by the reference numerals 12 and 14. The members 12 and 14 include opposed first hook portions 16 and 18, respectively, which are intended to be received over a cleat 20 of a vehicle track 22, as is best illustrated in Figure 2. Each of the first hook portions 16 and 18 is provided with a setscrew 24 for clamping the first hook portions 16 and 18 relative to the track cleat 20, as is best illustrated in Figure 2.

The members 12 and 14 also include second hook portions 26 and 28, respectively, which are disposed in opposite relation. Further, the hook portions 26 and 28 diverge in the direction of pull to be applied thereon. Each of the members 12 and 14 including an intermediate portion which is flat and which extends between the first hook portions 16 and 18 and the second hook portions 26 and 28, respectively, thereof. Each intermediate portion includes a transverse axis which extends between its respective first and second hook portions. The first hook portions are connected to their respective intermediate portions along lines which are disposed normal to the transverse axis of their respective intermediate portion. The second hook portions are connected to their respective intermediate portion along a line which is inclined to the transverse axis of its respective intermediate portion.

When the members 12 and 14 are properly mounted on a track cleat 20, as is best illustrated in Figure 2, the second hook portions 26 and 28 are disposed in spaced horizontally aligned relation. Entrained about the hook portions 26 and 28 is a loop 30. The loop 30 is retained over the hook portions 26 and 28 by retaining fasteners 32 adjustably carried by the hook portions 26 and 28.

The self towing device 10 also includes a tow cable 34 which is provided at one end thereof with an eye 36 for engaging the loop 30. The opposite end of the cable 34 will be provided with a hook 38 for forming a loop 40.

Although the cable 34 has been illustrated as being connected to the loop 30, it is to be understood that if desired the loop 30 may be dispensed with and the cable 34 entrained about the second loop portions 26 and 28 and then hooked back onto itself to form an integral loop.

Inasmuch as the hook portions 26 and 28 diverge, it is readily apparent that the members 12 and 14 are in a left and right relation. In order that a track vehicle may be properly pulled out from a stuck condition, there is to be provided one self towing device for each of the tracks 22 thereof.

Referring now to Figure 1 in particular, it will be seen that there is illustrated a track vehicle which is referred to in general by the reference numeral 42. The track vehicle 42 is provided with a pair of tracks 22 formed of a plurality of individual cleats 20. When the self towing devices 10 are properly secured to the tracks 22, the cables 34 thereof are entrained over the tracks 22 and down beneath the tracks 22 with their rear portions being connected to suitable dead-men 44 by the loops 40. The tracks 22 may then be run in reverse to retract the stuck vehicle 42.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A self towing device for track vehicles comprising a pair of generally S-shaped members, each of said S-shaped members including a flat intermediate portion with integral first and second hook portions at opposite ends thereof, said first hook portion being adapted to be engaged over an outer edge of a track cleat and being disposed outermost in depending relation and opening inwardly, said intermediate portion having a transverse axis extending between said hook portions, said first hook portion being connected to said intermediate portion along a line disposed normal to said transverse axis, said second hook portion being disposed innermost in upwardly projecting relation and opening outwardly, said second hook portion being connected to said intermediate portion along a line inclined to said transverse axis, said S-shaped members being of a left and right hand relation, a flexible loop connecting together said second hook portions, a flexible tow member connected to said loop for exerting a pull, said second hook portions diverging in a direction of pull on said tow member whereby a pull on said tow member urges said S-shaped members towards each other, releasable retaining means carried by said second hook portions for retaining said loop therein, and means on said first hook portions for retaining said S-shaped members on a track cleat.

2. The self towing device of claim 1 wherein said last mentioned means are in the form of setscrews.

References Cited in the file of this patent

UNITED STATES PATENTS

| | | |
|---|---|---|
| 57,476 | Chapman | Aug. 28, 1866 |
| 987,776 | Verdin | Mar. 28, 1911 |
| 1,326,802 | Strathern | Dec. 30, 1919 |
| 1,377,439 | Rice | May 10, 1921 |
| 1,431,338 | Stokes | Oct. 10, 1922 |
| 1,432,077 | Metcalf | Oct. 17, 1922 |
| 1,685,145 | Bartenbach et al. | Sept. 25, 1928 |
| 1,718,509 | West | June 25, 1929 |
| 2,479,748 | Lassila | Aug. 23, 1949 |
| 2,573,216 | Natoli | Oct. 30, 1951 |
| 2,744,690 | McClain | May 8, 1956 |